United States Patent
Herzinger et al.

(10) Patent No.: US 9,597,755 B2
(45) Date of Patent: Mar. 21, 2017

(54) METHOD FOR CONNECTING COMPONENTS

(71) Applicant: Bayerische Motoren Werke Aktiengesellschaft, Munich (DE)

(72) Inventors: Thomas Herzinger, Munich (DE); Johann Van Niekerk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 514 days.

(21) Appl. No.: 13/840,959

(22) Filed: Mar. 15, 2013

(65) Prior Publication Data

US 2013/0212858 A1    Aug. 22, 2013

Related U.S. Application Data

(63) Continuation of application No. PCT/EP2011/004176, filed on Aug. 19, 2011.

(30) Foreign Application Priority Data

Sep. 24, 2010  (DE) .................. 10 2010 041 356

(51) Int. Cl.
  *B23P 19/00* (2006.01)
  *F16B 5/06* (2006.01)

(52) U.S. Cl.
  CPC ............ *B23P 19/00* (2013.01); *F16B 5/0642* (2013.01); *F16B 5/0664* (2013.01); *Y10T 29/49826* (2015.01)

(58) Field of Classification Search
  CPC .. Y10T 29/49826; B23P 19/00; F16B 5/0664; F16B 5/0642; B23Q 17/2409; B23Q 17/2414; B23Q 17/00
  See application file for complete search history.

(56) References Cited

U.S. PATENT DOCUMENTS 2,275,900 A * 3/1942 Hall ............................ 52/511
3,235,929 A * 2/1966 Sweeney et al. ........... 24/295
(Continued)

FOREIGN PATENT DOCUMENTS

CN    101392782 A    3/2009
DE    33 02 177 A1    8/1983
(Continued)

OTHER PUBLICATIONS

International Search Report dated May 4, 2012 with English translation (six (6) pages).
(Continued)

*Primary Examiner* — Sarang Afzali
*Assistant Examiner* — Ruth G Hidalgo-Hernande
(74) *Attorney, Agent, or Firm* — Crowell & Moring LLP (57) ABSTRACT

A method for connecting components includes the acts of providing a first component, fixing the first component in a space, where the exact position of the first component in a space does not have to be known or is unknown, determining the exact position of the first component in a space by a position recognition device, which generates the position data that correspond to the position of the first component, attaching or producing at least one first fixing element on the first component by an electronically controlled device, which attaches or produces the at least one first fixing element in a specified position relative to the first component using the determined position data, and fixing a second component on the first component, where a second fixing element, which is provided on the second component, forms a detachable connection with the first fixing element.

26 Claims, 4 Drawing Sheets

(56) References Cited

U.S. PATENT DOCUMENTS

| | | |
|---|---|---|
| 4,637,116 A | 1/1987 | Paerisch et al. |
| 4,942,539 A | 7/1990 | McGee et al. |
| 5,148,591 A | 9/1992 | Pryor |
| 5,150,623 A | 9/1992 | Woods |
| 5,380,978 A | 1/1995 | Pryor |
| 5,727,300 A | 3/1998 | Ekdahl et al. |
| 8,017,887 B2 | 9/2011 | Meyer et al. |
| 8,064,686 B2 | 11/2011 | Wagner et al. |
| 2003/0090682 A1 | 5/2003 | Gooch et al. |
| 2004/0134968 A1 | 7/2004 | Opper |
| 2007/0079491 A1 | 4/2007 | Hader |
| 2008/0175656 A1 | 7/2008 | Blattner et al. |
| 2009/0070983 A1 | 3/2009 | Stumpf et al. |
| 2011/0173797 A1 | 7/2011 | van Niekerk et al. |

FOREIGN PATENT DOCUMENTS

| | | |
|---|---|---|
| DE | 34 41 349 A1 | 5/1986 |
| DE | 197 45 728 A1 | 4/1999 |
| DE | 201 08 408 U1 | 11/2001 |
| DE | 101 19 018 A1 | 10/2002 |
| DE | 197 01 365 B4 | 5/2004 |
| DE | 696 32 309 T2 | 9/2004 |
| DE | 10 2004 046 584 A1 | 5/2005 |
| DE | 10 2004 010 036 A1 | 9/2005 |
| DE | 20 2006 009 036 U1 | 12/2006 |
| DE | 198 56 133 B4 | 4/2008 |
| DE | 10 2007 044 635 A1 | 4/2009 |
| DE | 10 2007 061 803 B3 | 6/2009 |
| DE | 10 2008 038 747 A1 | 2/2010 |
| DE | 10 2009 049 602 B3 | 7/2011 |
| DE | 10 2010 028 322 A1 | 11/2011 |
| DE | 10 2010 028 323 A1 | 11/2011 |
| DE | 10 2010 040 547 A1 | 3/2012 |
| EP | 0 261 297 A1 | 3/1988 |
| EP | 0 592 585 A1 | 4/1994 |
| EP | 0 909 938 A2 | 4/1999 |
| EP | 1 645 439 A2 | 4/2006 |
| EP | 1 772 199 A1 | 4/2007 |
| EP | 1 812 198 A1 | 8/2007 |
| EP | 2 154 054 A1 | 2/2010 |
| EP | 2154054 A1 * | 2/2010 |
| FR | 2 761 626 A1 | 10/1998 |
| GB | 2 375 569 A | 11/2002 |
| WO | WO 9301080 A1 * | 1/1993 |
| WO | WO 2009/095267 A1 | 8/2009 |
| WO | WO 2009/140977 A1 | 11/2009 |
| WO | WO 2011/029501 A1 | 3/2011 |

OTHER PUBLICATIONS

German Office Action dated Jun. 30, 2011 (five (5) pages).
English translation of Chinese Office Action dated Jan. 6, 2015 (Nine (9) pages).

* cited by examiner

METHOD FOR CONNECTING COMPONENTS

CROSS REFERENCE TO RELATED APPLICATIONS

This application is a continuation of PCT International Application No. PCT/EP2011/004176, filed Aug. 19, 2011, which claims priority under 35 U.S.C. §119 from German Patent Application No. DE 10 2010 041 356.9, filed Sep. 24, 2010, the entire disclosures of which are herein expressly incorporated by reference.

BACKGROUND AND SUMMARY OF THE INVENTION

The present invention relates to a method for connecting components.

Component connections, which are closely related to the subject matter of the present patent application, are known from two German patent applications DE 10 2010 028 323.1, which is not a prior publication, and DE 2010 040 547.7.

Furthermore, relevant prior art includes DE 10 2009 049 602.5, DE 10 2008 038 747 A1, DE 10 2009 041 161 A1, DE 10 2010 028 322 A1, DE 10 2007 044 635 A1, DE 10 2004 046 584 A1, DE 3302177 A1, U.S. Pat. No. 4,942,539, US 2003/0090682 A1, EP 1 772 199 A1, U.S. Pat. No. 5,150, 623, DE 197 45 728 A1, DE 696 32 309 T2, as well as DE 10 2007 061 803 B3.

During mass production of vehicle bodies a plurality of individual body parts and add-on parts, such as holders, etc., are assembled by robots in such a way that the process is totally automated to a large extent. During a joining or, more specifically, connecting operation, two or more vehicle body parts are first positioned relative to one another by means of a time consuming chucking and receiving technique and are then subsequently connected together, for example, by welding, clinching or other joining methods.

In the aforementioned DE 10 2010 040 547.7, the objective is to achieve a pluggable clamping connection, by which two or more components of a vehicle body can be (pre) assembled in a simple way. A "male fixing part" projects from a first of at least two components; and this male fixing part is inserted into a hole-like "female fixing element," which is provided on the other vehicle component, in an insertion direction. The male fixing element has a functional head, which has partially or completely the shape of a sphere or partially or completely a shape similar to a sphere. Moreover, this functional head has an excessive dimension in relation to the female fixing element more or less transversely to the insertion direction, so that the two vehicle body components are clamped together at the fixing elements.

When vehicle bodies are manufactured, the body parts that are to be connected together are usually held, grasped and/or transported by means of "component specific" holding devices and gripper devices and transport devices, respectively. The concept "component specific" means that the devices under discussion are conceived and designed individually to conform with the geometry of a specific component. It is often the case that one or more positioning or holding pins, from which the pertinent vehicle body component is suspended, project from such a "device." For this purpose the vehicle body component has corresponding receiving holes. The receiving holes are used to position the vehicle body component, which is to be joined, in a defined manner in relation to the respective device or the respective tool (i.e. in relation to a tool coordinate system).

Such systems and/or devices are associated with high initial investment costs. In operation, they occupy expensive production area, which in turn is associated with high costs. If a plurality of vehicle body components are to be connected to each other to form a component composite, then the various devices, machines and processes that are required to produce the connections lead to component and assembly tolerances that add up to a total tolerance of the component composite.

In order to keep the total tolerance within tolerable limits, the individual tolerances have to be chosen very fine, a feature that restricts the "robustness" of the production process and is associated with high costs.

The object of the present invention is to provide a method that is intended for connecting components, in particular vehicle body components, and that can be carried out with component-non-specific or, more specifically, geometry-non-specific devices.

This and other objects are achieved by a method for connecting components, the method comprising the following steps: providing a first component; fixing the first component in a space, where an exact position of the first component in the space does not have to be known or is unknown; determining the exact position of the first component in a space by way of a position recognition device, which generates the position data that correspond to the position of the first component; attaching or producing at least one first fixing element on the first component by way of an electronically controlled device, which attaches or produces the at least one first fixing element in a specified position relative to the first component using the determined position data; and fixing a second component on the first component, where a second fixing element, which is provided on the second component, forms a detachable connection with the first fixing element.

The invention is based on carrying out the "component handling" (transport, holding and alignment of components) and the joining procedure of individual components during the process of joining the components in a way that differs from the past approaches that used component-specific or, more specifically, geometry-specific devices. Rather, the present invention uses component-non-specific or, more specifically, geometry-non-specific devices and systems, respectively (for example, gripper systems), which can handle not only a specific type of component, but also a plurality, preferably an undefined plurality of different types of components or, more specifically, different geometries.

The term "vehicle component" that is used above is to be interpreted very broadly. In principle, this term "vehicle component" includes any kind of component that may be considered for the purpose of connecting components, in particular, the components of a vehicle body. When a "vehicle component" is addressed below, it must not be interpreted in a restrictive manner. Rather the invention is to be construed in a very loose sense for connecting components (also in other industrial branches). Correspondingly, the patent claims are also to be interpreted in a broad sense.

Whereas in the conventional production methods a component that is to be processed is held at a device (for example, a gripper system) in an exactly defined (specified) way and, as a result, has to be positioned relative to the system in an exactly predefined way, the invention provides that the geometry of a component that is to be joined and its location, or rather position in a space, has to be detected first, for example, by use of imaging sensor devices or the like. In this respect it does not matter that the component in question may be found in an exactly predefined relative position with respect to the, for example, gripper system. The component features that are relevant for detecting the component geometry and the component position can be given by the shape of a component or can be brought into a component especially for this purpose.

For example, in the case of a sheet metal part that is produced by a deep drawing operation, a marking (that can have, for example, the form of a cross hair) can be embossed in the sheet metal part directly during manufacturing, i.e. during the deep drawing procedure. Such "final print markings" can be detected by optoelectronic devices and can be used to determine the position of a component in a space as well as to inspect and monitor the dimensional accuracy of individual components of a component composite relative to each other.

According to the invention, the alignment of individual components that are to be connected to each other does not take place relative to a coordinate system of a device. Rather, the components that are to be connected to each other are aligned only relative to each other, i.e. independently of the actual position and alignment of a component or the component composite respectively with respect to a stationary coordinate system or a device-fixed coordinate system.

If a component composite is to be assembled in succession by connecting individual components, then the position of a first component, i.e. a component from which one would like to start, is determined in a space. Additional components, which are to be connected to the first component, are aligned with respect to a "component coordinate system," which is fixed with respect to the first component.

The relative movement of the components, which are to be connected to each other, can take place in a software controlled manner by use of standard actuators, for example, robots, geometry-non-specific grippers, etc.

Since it is possible to dispense with geometry-specific devices or, more specifically holding devices and grippers, the costs relating to the initial investment in the product decrease. Since geometry-non-specific devices can be used for very different components, it is possible to make do with fewer devices altogether. Correspondingly, the amount of floor space required for production is less.

The use of component-non-specific holding devices or more specifically gripper devices (in general devices) makes it possible to manufacture a wide range of different design variants or also different components with one and the same device (trade-off flexibility) and, as a result, to operate the device at maximum capacity. When component-non-specific devices are used, changes that are introduced due to the component geometry in the course of a product's life cycle can be handled by suitably adapting the software, so that it is not necessary to make hardware changes to this end.

Furthermore, the dimensional accuracy of the component composite is monitored in an advantageous way relative to the component coordinate system, which is defined by the first component, or more specifically by the position of the first component, in a space. In this case ideally the same sensor devices are used exclusively, but not necessarily; and these sensor devices can also be used for aligning the components.

In one aspect of the invention, a starting point is a first component, which can be, for example, a body component for a vehicle body. The first component is fixed in a space, for example, by use of a robot, which can have a gripper, which does not necessarily have to be adapted individually to a very specific first component. Rather a "standard gripper device" can be used that lends itself well to gripping a plurality of different geometries.

When the first component is fixed in a space, its exact position in a space does not have to be known (yet) or rather can be unknown. The exact position of the first component in a space is determined, according to the invention, by use of a "position recognition device," which generates the position data that clearly describe the position of the first component in a space. The term "position recognition device" is to be interpreted very broadly. Basically, this position recognition device comprises all of the devices that can be used to determine and describe the position of an object in a space, in particular, imaging devices and/or methods that work with camera systems and electronic evaluation units When the exact position of the first component was determined in a space, at least one "first fixing element" is attached or produced on the first component. The first fixing element may be, for example, a separate element that is brought from the outside to the first component and is connected to the first component. As an alternative, the first fixing element could also be produced from the material of the first component by forming the first component at a defined location.

The step of attaching or producing the at least one first fixing element is carried out by way of an electronically controlled (production) device, which arranges or rather produces the at least one first fixing element in a specified position relative to the first component using the previously determined position data that describe the position of the first component in a space. Hence, the first fixing element is attached or produced with respect to a processing coordinate system that is defined by the first component.

In a next step, a second component is fixed on the first component in a detachable manner. The connection is performed by way of at least one second fixing element, which is provided on the second component and which forms a detachable connection with the first fixing element provided on the first component. In this way component composites can be constructed according to a similar principle known from the familiar toy domain of, for example, building blocks that can be clamped together.

Preferably, the second component is fixed on the first component in an automated manner. This can be done with an electronically controlled device, to which the previous determined position data, which describe the exact position of the first component in a space, are fed. As an alternative or in addition, the position of the at least one first fixing element can be detected by use of a position recognition device; or it is possible to use the position data, which are used for attaching or producing the first fixing element on the first component and which describe the specified position of the first fixing element relative to the first component. By using this position data or position data of this nature, the second component can be aligned relative to the first component or more specifically relative to the at least one first fixing element by way of the electronically controlled device.

It goes without saying that the second component can also be fixed by hand on the first component by fitting together the fixing elements that are assigned to each other.

The two components are fixed on each other in a detachable manner in such a way that the one fixing element is brought to the other fixing element, provided on the other component, along an insertion direction; or more specifically the one fixing element is inserted into the fixing element provided on the other component and is then securely clamped. After the two components have been connected in a detachable manner, these two components are fixed (in a detachable manner) in directions transversely to the insertion direction in such a way that they cannot be displaced relative to each other.

The fixing elements can be configured in such a way that they form a clip or snap connection. It can be provided that the one fixing element is snap locked on the other fixing element or more specifically that the one fixing element is brought into a position that extends behind the other fixing element. As a result, a positive locking engagement that acts against the insertion direction can be provided between the fixing elements. However, it is not absolutely necessary that such a positive locking engagement, or rather undercut, be provided.

The two components can be clamped together in a purely non-positive locking manner by way of a pair of fixing elements. As an alternative, the two components can be clamped together by way of a pair of fixing elements in a non-positive locking manner and in a positive locking manner.

After the two components have been (pre)fixed in a detachable manner by use of the fixing elements, the components can be connected to each other such that they cannot be detached, for example, by welding. A key advantage of the invention lies in the fact that additional chucking devices, or more specifically clamping devices, which would compress the two components (during, for example, the welding process) are not required for connecting in a non-detachable manner. Rather, it suffices that the two components are held relative to each other before or during the welding procedure by just the fixing elements alone, which are connected to each other in a detachable manner.

According to a further aspect of the invention, a "male fixing element" is used as the first fixing element, i.e. an element that "projects" from the first component in some way. The second fixing element is preferably a female fixing element that interacts with the male fixing element. The components can be clamped on one another by fitting together the two fixing elements or by plugging the two fixing elements into each other. The term "female fixing element" is also to be interpreted very broadly. What is meant are the design configurations that enable the male fixing element to be inserted into the female fixing element in an insertion direction. Hence, the (vehicle) components can be easily fitted together in a manner analogous to the familiar plug-in construction kits known from the toy domain and can be (pre)fixed relative to each other in this way.

The male fixing element has an excessive dimension in relation to the female fixing element more or less transversely to the insertion direction, so that, after the two components have been fitted together, the two components are clamped together at the fixing elements.

According to a further development of the invention, an element, which is designed as an element that has the shape of a sphere or a shape similar to a sphere, or which has a section that has the shape of a sphere or a shape similar to a sphere, is used as a first fixing element. The male fixing element can be made completely of metal, in particular, steel or aluminum. It can be connected, for example, by welding, to the first component, for example, by material bonding. In particular, a sphere, which acts as the first fixing element, can be welded directly onto the first component.

As an alternative, it is also possible to use a first fixing element that comprises a functional head, which has partially or completely the shape of a sphere or partially or completely a shape similar to a sphere; and this functional head has a foot region, which is connected (for example, in one piece) with the functional head. The foot region can be connected to the first component in a positive locking manner, for example, by way of a cold joining procedure (for example, pop rivets, press fitting).

The concept "similar to a sphere" that is used in the aforesaid may also be interpreted very broadly and must not be limited to the mathematical concept of a spherical geometry. The concept "similar to a sphere" may also be understood to mean, for example, that the shape is "curved in a convex manner." Preferably, the male fixing element that is constructed in the shape of a sphere or similar to a sphere is rotationally symmetrical with respect to the direction of a normal line of one or both vehicle components at the location of the male fixing element. The terms "spherical" or "similar to a sphere" include, as a general principle, "round" or "curved," in particular, "convexly curved" geometries. The term "spherical shape" is used herein to encompass all of the variations noted above.

A male fixing element that is configured in this way can be fitted together with the second (vehicle) component in a very easy way. The round, edgeless geometry of the male fixing element minimizes the risk of an unintentional tilting of the two (vehicle) components when they are fitted together.

If a first fixing element, which is formed by way of a functional head and a foot region that is connected to the functional head, is used, then the foot region can assume, generally speaking, the function of a connecting element, by which the functional head is connected to the first component.

The foot region can be constructed as a "press fitting element" in an economical way. Using the current press fitting techniques (such as pop rivets), the foot region can be "press fit" into the second component with a high degree of accuracy, so that the press fitting operation produces a positive locking connection with the first component that cannot be detached, i.e. a connection that is permanently secured. The foot region can be configured, for example, as a self-piercing rivet. The press fitting of the foot section can be carried out in a fully automated manner by way of a suitable robot device.

As an alternative, a press fitting device can be integrated into the forming tool. For example, a pop rivet device can be integrated into a deep drawing tool, an arrangement that makes it possible to set the male fixing element during or towards the end of a deep drawing operation, by which the first (sheet metal) component is formed into a three dimensional object. As an alternative, the foot region could also be configured as a screw shank and could be intended to be screwed into an associated tapped bore of the first component.

Vehicle components, such as individual body parts of a vehicle, can be connected to each other, i.e. (pre)assembled, by use of one or more of such pairs of fixing elements. In this case the individual components need only be "fitted together." Depending on the type of (vehicle) component and the "clamping force" that is intended in terms of the design, the two (vehicle) components can be connected to each other exclusively by use of such pairs of fixing elements or, in addition, by way of one or more other joining techniques, such as welding, screwing, riveting, clinching etc. In particular, such joining techniques that can be produced on the part of a single component ("one-sided connection methods") are also suitable. One example that may be mentioned here is laser welding, where, in contrast to spot welding methods, the "component composite" does not have to be accessible from both sides by means of welding tongs, but rather work can be performed from a single side.

The female fixing element can be formed by a "passage hole" provided in the second (vehicle) component. The term "passage hole" is to be broadly interpreted and must not be limited per se to a certain hole geometry. The passage hole can be, for example, circular or can have a geometry that deviates from a circular shape, such as a geometry that is in essence square or a geometry that has the shape of a triangle, rectangle or polygon, where the "corners" may be rounded.

Since the at least one male fixing element has a defined excessive dimension in relation to the female fixing element transversely to the insertion direction, the two fixing elements or at least one of the two fixing elements must exhibit a certain degree of "minimum elasticity," in order to facilitate the fitting together and so that an adequate amount of clamping force remains after the fitting together.

The male fixing element, or more specifically the functional head of the male fixing element, can be, for example, a sphere made of a solid material, in particular, a steel or aluminum sphere. Such a "solid sphere" exhibits comparatively little elasticity. The minimum elasticity that is necessary for fitting together can be achieved by use of a suitable design of the female fixing element.

It can be provided that upon fitting together, the two (vehicle) components are connected to each other with zero play at the fixing elements in directions that are transverse to the insertion direction. That is, the vehicle components are fixed in such a way that they cannot be displaced relative to each other.

As stated above, the two (vehicle) components can be (pre)fixed relative to each other by use of a plurality of such component connections or similar component connections. Correspondingly one of the two (vehicle) components can have at least one additional male fixing element of this type (see the above description) that also has partially or completely the shape of a sphere or more specifically partially or completely a shape similar to a sphere; and this one additional male fixing element can be inserted or is inserted into an associated additional female fixing element, which is provided on the respective other (vehicle) component, in one or in the same direction of insertion as the first male fixing element.

The at least one additional female fixing element can be formed by a slot or, more specifically, an oblong passage hole, in which the additional male fixing element or, more specifically, a functional head of the additional male fixing element can be slid in a longitudinal direction of the slot or more specifically the oblong passage hole.

Therefore, the one "component connection" forms, figuratively speaking, a "fixed bearing"; and the at least one additional component connection forms a "floating bearing." This arrangement has the advantage that the two (vehicle) components that are to be connected to each other can be fitted together or rather can be fixed on each other in a "floating" manner and, as a result, in essence without tension.

According to a further aspect of the invention, at least one flexible clamping element, which projects from the second (vehicle) component, is provided on an edge of the passage hole that forms the female fixing element. The clamping element exerts from the outside a clamping force, which acts more or less transversely to the direction of insertion, on the outside of the functional head of the male fixing element. The clamping element can extend behind the functional head of the male fixing element. However, this does not have to be necessarily the case. In the case of an undercut, the joining together, i.e. the fitting together of the two fixing elements, results in one of the fixing elements being "pushed over" the other fixing element, so that it is possible to hear the functional head of the male fixing element snap lockingly into, or more specifically onto, the female fixing element.

The clamping element can be a clamping collar that extends along the entire edge of the passage hole. As an alternative, only one clamping collar element need be provided; and this clamping collar element extends over a peripheral section. Furthermore, a plurality of clamping collars that are spaced apart from each other in the circumferential direction may be provided along the passage hole. In this context the clamping collars touch from the outside on a peripheral section or on a peripheral point of the functional head of the male fixing element. It can also be provided that only one portion of the provided clamping collars presses from the outside against the functional head of the male fixing element.

It can be provided that the clamping collar or rather the clamping collars projects or project from the second (vehicle) component in the direction of insertion or against the direction of insertion. The at least one clamping collar does not have to be bent in its entirety perpendicular with respect to the second vehicle part, but rather can be positioned in a slightly inclined manner. For example, it can be provided that the at least one clamping collar encloses with the surface of the second (vehicle) component in an area of the passage hole an angle that lies in a range between 80° and 90°.

The first and/or the second (vehicle) component may be a sheet metal component, in particular, a body part of a vehicle. As an alternative, the first and/or the second (vehicle) component may also be a plastic component, in particular, a plastic component made of a synthetic plastic material that is reinforced with fibers.

The passage hole that forms the female fixing element can be punched out of the second (vehicle) component. The clamping collar may be a "bent," "raised" or upright section of the punched passage hole.

One or both of the vehicle parts can be, in particular, deep drawn parts. The at least one female fixing element, which can be formed, for example, by a passage hole, can be punched out directly in the deep drawing tool or can be produced in a subsequent production step.

Other objects, advantages and novel features of the present invention will become apparent from the following detailed description of one or more preferred embodiments when considered in conjunction with the accompanying drawings.

DETAILED DESCRIPTION OF THE DRAWINGS

Figures 1, 2, 3:
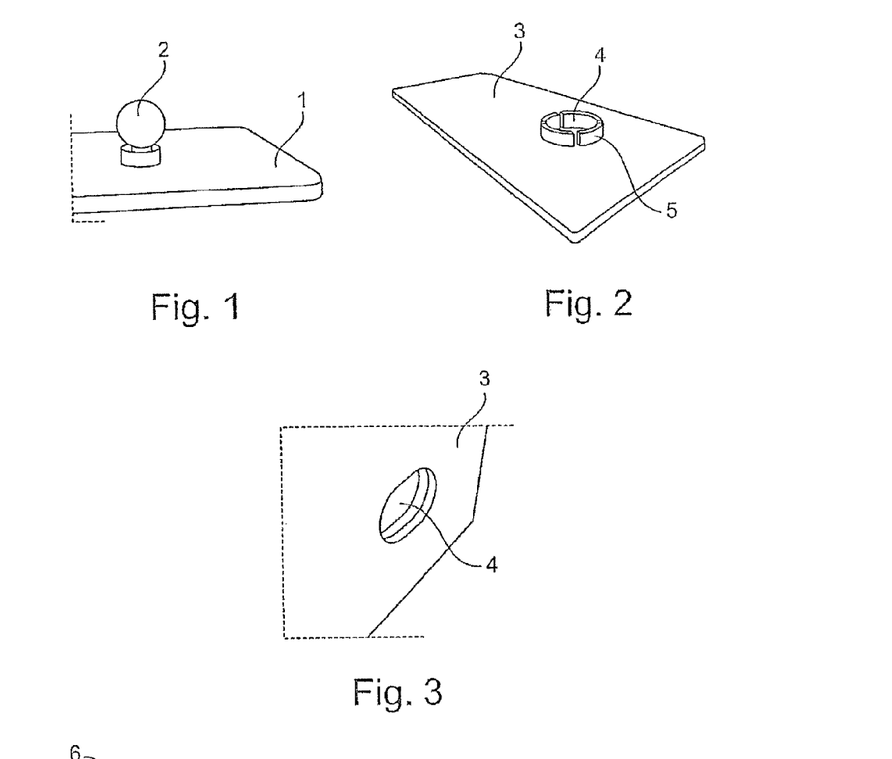
FIG. 1 is a perspective view of a sheet metal plate, onto which a steel sphere is welded.
FIGS. 2 and 3 are different views of a sheet metal plate with a passage hole having a circumferential clamping collar.

FIG. 1 shows a first sheet metal plate 1, on which a male fixing element is fixed; and this male fixing element has a functional head that is designed as a steel sphere 2.

FIGS. 2 and 3 show a second sheet metal plate 3, into which a passage hole 4 is punched. This passage hole has a bent collar 5 that acts as a clamping collar. The passage hole 4 and the clamping collar 5 respectively have a slightly smaller diameter than the sphere 2 that forms the functional head. However, the clamping collar is sufficiently elastic, so that the sphere 2 can be pressed into, or more specifically pressed through, the passage hole 4.

The passage hole 4 can have, as shown in FIGS. 2 and 3, an approximately rectangular or square shape with, for example, rounded corners. In the case that the passage hole geometry is approximately square, the clamping collar 5 presses from the outside against the sphere 2 in a point-like manner at four locations, which are spaced approximately 90° apart from each other.

Figure 4:
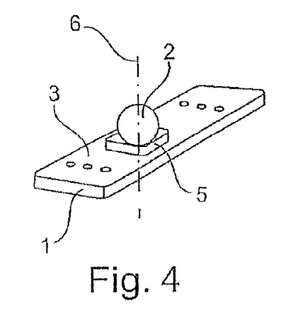
FIGS. 4 to 6 are perspective views of a number of exemplary embodiments with different clamping collars.

FIG. 4 shows the two sheet metal plates 1, 3 in the fitted together state. The sphere, which is fixed on the sheet metal plate 1, was pushed through the passage hole 4 from the bottom. The clamping collar 5 presses more or less transversely relative to the direction of insertion 6 from the outside against the sphere 2. As a result, the two sheet metal plates 1, 3 are positioned securely and in essence with zero play relative to each other in directions that are transverse to the direction of insertion 6.

Figure 5:
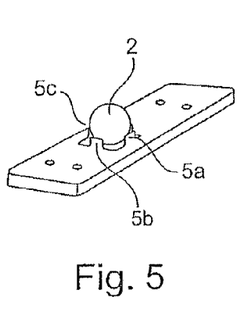

FIG. 5 shows an exemplary embodiment, where, instead of a circumferential clamping collar, a plurality of clamping collar elements 5a, 5b, 5c, which resemble teeth, are provided in a uniformly distributed manner in the circumferential direction.

Figure 6:
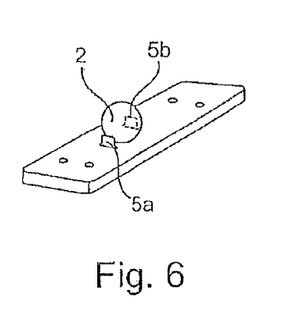

In the exemplary embodiment of FIG. 6, only two such tooth-like clamping collar elements 5a, 5b are provided; and these tooth-like clamping collar elements are spaced approximately 180° apart from each other in the circumferential direction. The two clamping collar elements 5a, 5b are arranged on opposite sides of the sphere 2.

Figure 7:
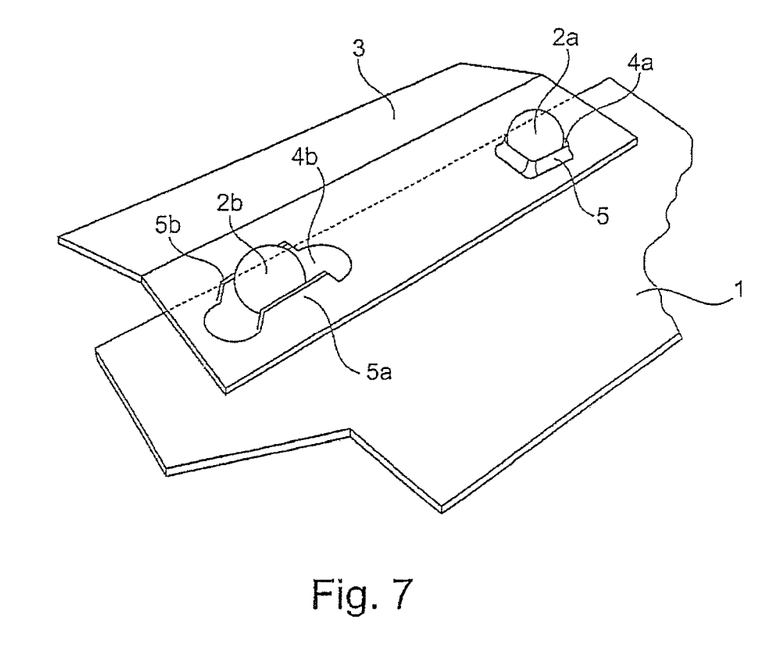
FIG. 7 shows two components according to an embodiment of the invention; and these two components are fixed to each other in a floating manner.

FIG. 7 shows an exemplary embodiment, in which a first sphere 2a and a second sphere 2b are arranged on a first sheet metal plate 1 in such a way that they are spaced apart from each other. Each of the two spheres 2a, 2b is connected to the sheet metal plate 1 by a foot region, which is a part of the respective male fixing element, but is not shown more closely in the embodiment. The foot regions, or more specifically the foot sections, may have been connected to the sheet metal plate 1, for example, by way of cold joining techniques.

Of the wide range of "press fit methods" that may be considered here, one example is the pop rivet method.

The second sheet metal plate 3 has a first rectangular or square passage hole 4a, which is assigned to the sphere 2a. This passage hole has a circumferential clamping collar 5 that is similar to the clamping collar depicted in FIGS. 2 to 4. As a result, the two sheet metal plates 1, 3 are securely fixed relative to each other transversely to the direction of insertion in the region of the sphere 2a.

In contrast, the second passage hole 4b involves an oblong passage hole having two clamping collars 5a, 5b, which extend in the longitudinal direction of the hole; and each of these clamping collars pushes against the outside of the sphere 2b from the opposite side. In the arrangement depicted in FIG. 7, the sheet metal plates are fixed on each other "in a floating manner." The oblong hole 4b eliminates any tension between the fastening points.

The two sheet metal plates 1, 3 can be easily fitted together and then subsequently connected to each other securely and permanently, for example, by welding. The thermal expansion occurring during the welding operation is "automatically" equalized owing to the floating arrangement of the two sheet metal plates.

Figure 8:
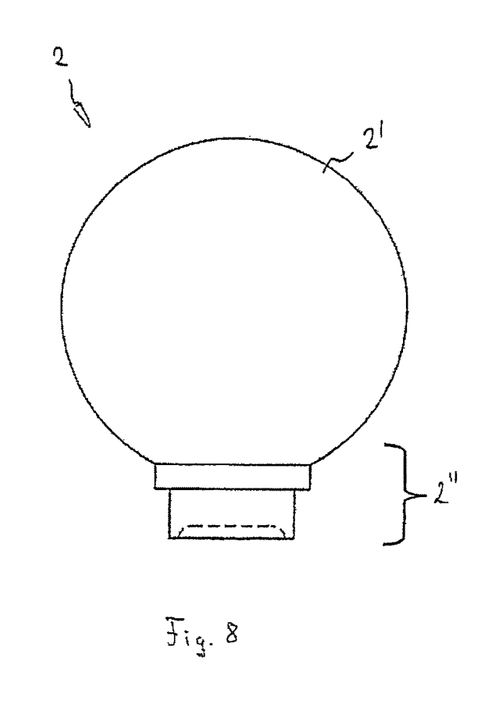
FIG. 8 is a side view of a first exemplary embodiment of a male fixing element according to the invention.

FIG. 8 shows a male fixing element 2, which has a spherical functional head 2' and a foot region, or more specifically a foot section 2", that is integrally connected to the functional head. In this case the foot region 2" is constructed in the form of a (self-piercing) pop rivet. In the course of setting, i.e. in the course of pressing in the foot region 2" which is designed as a pop rivet, the frontal region of the foot region 2" penetrates into the first sheet metal plate 1 (cf. FIG. 1) and, in so doing, expands radially, so that the result is a permanently secured, positive locking connection with the first sheet metal plate 1.

Figure 9:
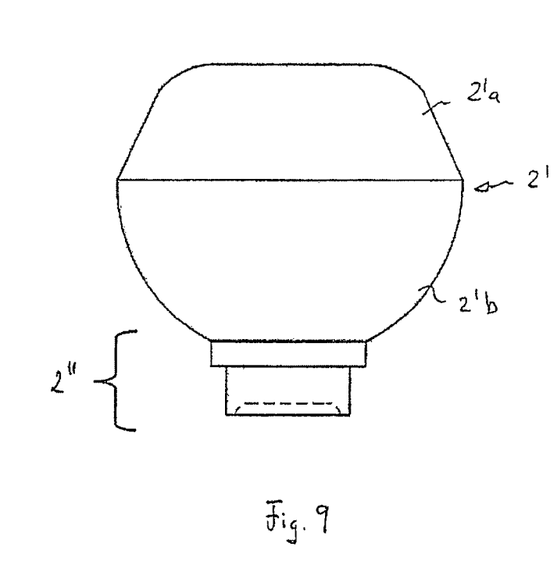
FIG. 9 is a side view of a second exemplary embodiment of a male fixing element according to the invention.

FIG. 9 shows an exemplary embodiment, in which the functional head 2' exhibits an upper rounded region 2'a, which tapers off conically towards the top, and a spherical region 2'b, which is connected to the upper rounded region towards the bottom. The spherical region is designed as a pop rivet in a manner analogous to the exemplary embodiment in FIG. 8.

Figure 10:
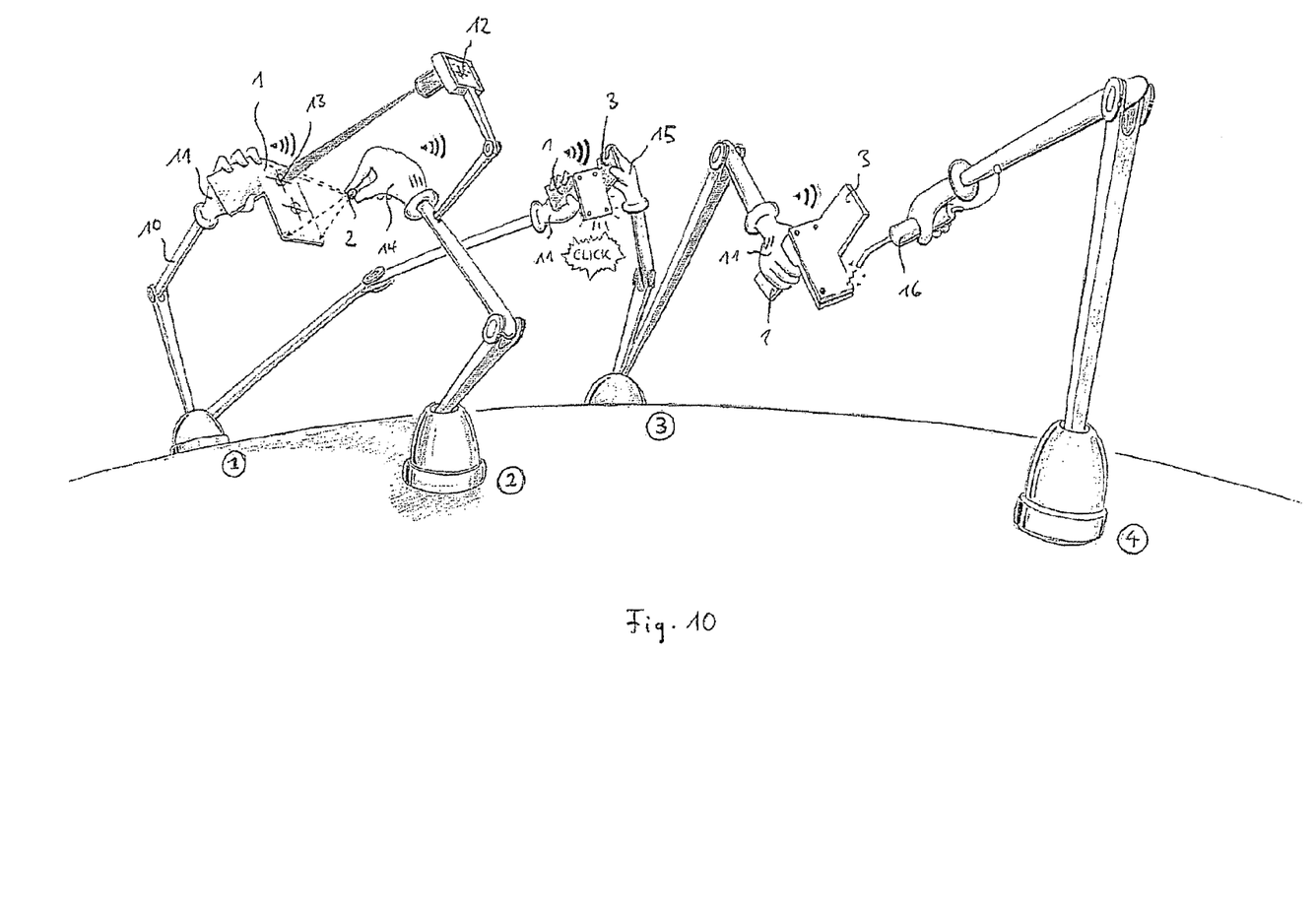
FIG. 10 is a schematic drawing, which describes the method for connecting two components according to an embodiment of the present invention.

FIG. 10 describes the basic principle of the method for connecting components. A first component 1 is grasped by a first holding device, or more specifically gripper device 10, which may be, for example, a robot, and is fixed in a space. The gripper 11 that is shown in FIG. 10 and is similar to a hand is supposed to show unequivocally that the gripper is not adapted individually to the first component 1, but rather the gripper is a component-non-specific standard gripper that is capable of grasping and fixing components that are constructed very differently. The relative position of the first component with respect to the gripper 11 does not have to be known exactly or can even be unknown.

A position recognition device 12 is used to determine the exact position of the first component 1 in a space. The position recognition device 12 can be, for example, a camera system (that consists, for example, of a plurality of cameras); and this camera system has an electronic image evaluation unit. The position recognition device 12 is capable of detecting the position of certain geometric features of components, such as corners, edges, holes, embossed cross hair marks 13, etc. By detecting a plurality of such features, or more specifically geometric locations, it is possible:

(1) to determine which first component from a set of first components known to the device is involved; and (2) to determine the exact position of the first component 1.

The spatial position of the first component 1 defines a processing coordinate system that is used for the subsequent working steps.

As soon as it is known which first component 1 is involved and in which exact position the first component 1 may be found in a space, a first fixing element is attached or produced on the first component 1. In the drawing shown in FIG. 10, a second gripper arm 14 applies a sphere 2, which acts as the first fixing element, on the first component 1 in a specified position relative to the first component 1. The sphere 2 may be welded to the first component 1, for example, by a welding robot, which is not shown more closely in this drawing.

FIG. 10 shows in schematic form that a plurality of such spheres, which act as the first fixing elements, can be welded on the first component 1. An additional gripper device (for example, a robot) 15 places a second component 3, which is provided with passage holes at those locations, at which the spheres are welded onto the first component 1, on the first component 1. In this case the passage holes act as the second fixing elements.

The two components 1, 3 are fitted together, as shown in FIG. 10, in a non-positive locking manner and/or in a positive locking manner by use of a plurality of such pairs of fixing elements. The pairs of fixing elements can be designed in such a way that they make it possible for the two components 1, 3 to be clipped together. In this case it involves a detachable connection of the two components 1, 3. However, the two components 1, 3 are held together by the pairs of fixing elements adequately secure, so that in an additional process step the two components 1, 3 can be welded together by a welding device 16 without any additional clamping or chucking devices.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for connecting components, the method comprising the acts of:
    providing a first component;
    placing the first component in a space, where an exact position of the first component in the space need not be known or is unknown;
    determining the exact position of the first component in the space via a position recognition device that generates position data corresponding to a position of the first component;
    using the determined position data, attaching or producing a first fixing element as part of the first component in a specified position relative to the first component via an electronically controlled device; and
    fixing a second component on the first component, where a second fixing element provided as part of the second component forms a detachable connection with the first fixing element.

2. The method according to claim 1, wherein one of the first fixing element and the second fixing element is a male fixing element; and
    wherein another of the first fixing element and the second fixing element interacting with the male fixing element is a female fixing element, the first and second components being clamped together by fitting together the male and female fixing elements.

3. The method according to claim 2, further comprising the act of producing the female fixing element by forming a passage hole in one of the first and second components.

4. The method according to claim 3, wherein, during the forming of the passage hole, an edge of the passage hole is bent such that the edge forms a flexible clamping element projecting from the component, the flexible clamping element being configured to exert a clamping force transverse to an insertion direction on an outer surface of the male fixing element.

5. The method according to claim 4, wherein after the fixing of the second component on the first component, the flexible clamping element extends behind the male fixing element.

6. The method according to claim 4, wherein the flexibly clamping element is a clamping collar extending along an entire periphery of the passage hole.

7. The method according to claim 4, wherein the flexible clamping element comprises a plurality of clamping collars spaced apart from one another about a circumference along an edge of the passage hole, the clamping collars contacting an outer peripheral section of the male fixing element.

8. The method according to claim 3, wherein the passage hole has a non-circular shape.

9. The method according to claim 3, wherein the forming of the passage hole is carried out by punching the passage hole out of the second component.

10. The method according to claim 2, wherein the male fixing element has an excessive dimension in relation to the female fixing element transverse to an insertion direction such that the first and second components are clamped together at the male and female fixing elements.

11. The method according to claim 2, wherein the male fixing element has a spherical shape.

12. The method according to claim 1, further comprising the act of:
    after forming the detachable connection of the first and second components, connecting the first and second components to one another in a non-detachable manner.

13. The method according to claim 12, wherein the act of connecting the first and second components in the non-detachable manner is carried out by welding the first and second components together.

14. The method according to claim 13, wherein the first and second components are held relative to one another exclusively via the first and second fixing elements forming the detachable connection before or during the act of welding the first and second components together.

15. The method according to claim 1, wherein the act of fixing the second component on the first component is carried out by an electronically controlled device, the electronically controlled device being fed the position data or is fed position data that relate to the first fixing element and are generated by the position recognition device.

16. The method according to claim 15, further comprising the act of:
    determining a position of the first fixing element via the position recognition device; and
    aligning the second component with the second fixing element that is assigned to the first fixing element.

17. The method according to claim 1, wherein:
    the first and second components are fixed on each other in a detachable manner, and
    the first fixing element is inserted into the second fixing element, along an insertion direction, and is securely clamped to the second fixing element.

18. The method according to claim 17, wherein, upon connecting the first and second components in the detachable manner, the first and second components are fixed in directions transverse to the insertion direction so as not to be displaced relative to one another.

19. The method according to claim 1, wherein the act of determining the exact position of the first component is carried out with a camera system and an electronic evaluation unit.

20. The method according to claim 1, wherein the second component is fixed manually on the first component.

21. The method according to claim 1, wherein the first and second fixing elements form a clip or snap connection, one of the fixing element being clipped or snapped locked on the other of the fixing elements.

22. The method according to claim 1, wherein the first and second components are clamped together in a non-positive locking manner at the first and second fixing elements.

23. The method according to claim 1, wherein the first and second components are clamped together in both a non-positive locking manner and in a positive locking manner.

24. The method according to claim 1, wherein the act of attaching or producing a first fixing element is carried out by welding the first fixing element to the first component.

25. The method according to claim 1, wherein the first fixing element comprises a functional head having a spherical shape and a foot section connected to the functional head, the method further comprising the act of connecting the foot section to the first component in a positive locking manner via a cold joining procedure.

26. The method according to claim 1, further comprising the act of attaching or producing an additional first fixing element on the first component and an additional second fixing element on the second component, wherein the detachable connection is formed with all of the fixing elements.

* * * * *